United States Patent [19]

Jaco, Jr. et al.

[11] 4,049,441
[45] Sept. 20, 1977

[54] METHOD OF EXTENDING THE LIFE OF A CATALYST IN A PROCESS OF PRODUCING METALLIC IRON PELLETS

[75] Inventors: Charles M. Jaco, Jr., Clover; Wallace C. Menear, Georgetown; Donald W. Clark, North Litchfield Beach, all of S.C.

[73] Assignee: Midrex Corporation, Charlotte, N.C.

[21] Appl. No.: 663,949

[22] Filed: Mar. 4, 1976

[51] Int. Cl.² .............................................. C21B 13/00
[52] U.S. Cl. ...................................... 75/35; 266/156; 423/242
[58] Field of Search .......................... 75/33, 34, 35, 36; 266/156; 423/220, 242; 252/373; 21/2.7 R

[56] References Cited
U.S. PATENT DOCUMENTS 2,225,131  12/1940  Reich ................................... 423/242
3,607,225   9/1971  Hatarescu et al. ......................... 75/35
3,748,120   7/1973  Begges et al. ............................ 75/35
3,749,386   7/1973  Beggs et al. .............................. 75/35
3,761,570   9/1973  Lowicki et al. ......................... 423/242

FOREIGN PATENT DOCUMENTS 680,868  10/1952  United Kingdom ................. 423/242

Primary Examiner—L. Dewayne Rutledge
Assistant Examiner—Michael L. Lewis
Attorney, Agent, or Firm—Ralph H. Dougherty

[57] ABSTRACT

A method of extending the useful life of a catalyst employed in the endothermic catalytic reforming of gaseous hydrocarbons in which a substantial portion of the sulfur contained in such gaseous hydrocarbons is removed by contacting them with an aqueous solution of a water soluble metallic salt having a free metallic ion which forms an insoluble precipitate with sulfur. A preferred salt is zinc chromate.

3 Claims, 2 Drawing Figures

METHOD OF EXTENDING THE LIFE OF A CATALYST IN A PROCESS OF PRODUCING METALLIC IRON PELLETS

BACKGROUND OF THE INVENTION

Steel makers are increasingly turning to direct reduction of iron as a raw material source for steelmaking furnaces. Suitable processes for the direct reduction of iron are several. U.S. Pat. No. 3,128,174 teaches a batch-wise process. U.S. Pat. No. 3,881,916 discloses a rotary kiln process. U.S. Pat. No. 3,748,120 teaches a shaft furnace direct reduction process in which a reducing gas is catalytically reformed from a mixture of a gaseous hydrocarbon and spent reducing gas from the reduction process. The spent reduction gas is cleaned and cooled upon exiting the reduction furnace prior to being introduced to a catalyst-containing reformer furnace. When the spent top-gas is recycled through the reformer and reintroduced to the reduction furnace as a reducing gas, sulfur is picked up from the furnace burden by the reducing gas and carried through the system to the reformer where it contaminates the catalyst.

This invention is a simplified method for reducing or preventing sulfur contamination of the catalyst by a simple treatment to the scrubber cooling water.

OBJECTS OF THE INVENTION

It is the principal object of the subject invention to provide a method of extending catalyst life in the reformer.

It is also an object to provide means to increase catalyst activity in the reformer.

It is also an object to provide a method for reducing the sulfur content of spent reducing gas introduced to a catalytic hydrocarbon reformer.

It is also an object to provide a method of simply and quickly renewing catalyst activity which had been decreased by sulfur interference, or to regain activity above certain critical levels.

It is also an object to provide a method for renewing the catalyst of a hydrocarbon reformer.

It is another object to provide a method for increasing production of a direct reduction shaft furnace.

It is a further object to provide a convenient and economical method of extending catalyst life.

BRIEF SUMMARY OF THE INVENTION

These and other objects, which will become readily apparent as the description proceeds are achieved by providing means for removing sulfur from gaseous hydrocarbon by contacting them with an aqueous solution of a sulfur removing reagent, preferably zinc chromate.

DETAILED DESCRIPTION

Figure 1:
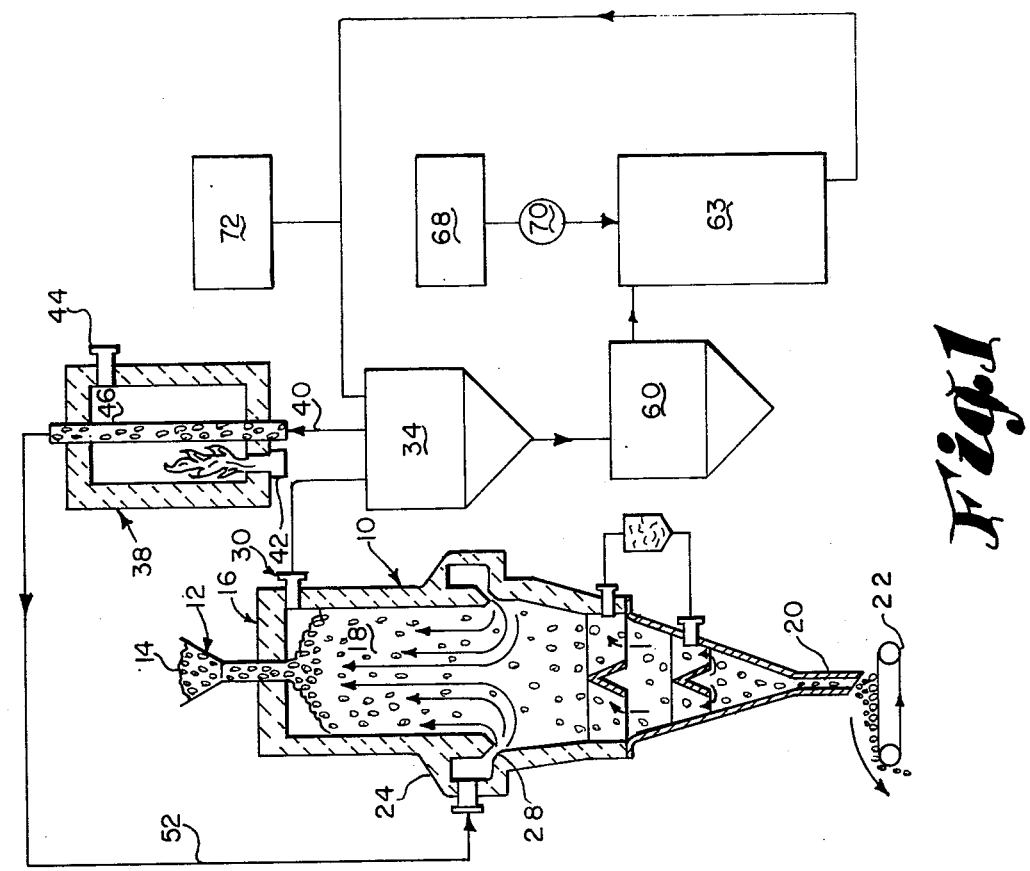
FIG. 1 is a schematic diagram of a vertical shaft furnace and its associated equipment for carrying out the objects of this invention.

Referring now to FIG. 1, a vertical furnace 10 has a feed hopper 12 mounted at the top thereof into which iron oxide pellets 14 or other raw materials such as lump ore are charged. The pellets descend by gravity through feed pipe 16 to form a burden 18 or bed of particulate iron-oxide-containing material in the shaft furnace. A pellet discharge pipe 20 is located at the bottom of shaft furnace 10. Reduced iron material is removed from the furnace by discharge conveyor 22 located beneath discharge pipe 20. Removal of the reduced iron from discharge pipe 20 establishes gravitational flow of the particulate iron oxide burden in shaft furnace 10.

A bustle and tuyere system indicated generally at 24 surrounds shaft furnace 10 and has gas ports 28 through which hot reducing gas is introduced to flow upwardly in counterflow relationship to the movement of the burden 18. The spent top-gas exits the furnace through gas takeoff pipe 30 at the top of the furnace.

The spent top-gas leaving the shaft furnace 10 through takeoff pipe 30 flows to a scrubber cooler 34 wherein the gas is cooled and the dust particles are removed. The cleaned and cooled top-gas is transmitted to a reformer 38 via pipe 40. The reformer is a furnace having fuel fired burners 42, a flue pipe 44 and a plurality of indirect heat exchanger catalyst tubes 46 which are externally heated, only one being shown. The reformer generates hot reducing gas which flows from the catalyst tubes to the bustle and tuyere system 24 through gas pipe 52.

The scrubber cooler 34, which is a standard venturi scrubber surrounded by an annular or sectional packed bed cooler, employs a recirculating scrub water system. Spent reducing gas flows downwardly through the venturi then upwardly through the packed bed through which cooling water is descending, providing intimate contact of the gas with the cooling medium. The scrub water flows from the cooler scrubber 34 to a clarifier 60. After the solids have settled out, the overflow is directed to a cooling tower 63 both to reduce the temperature of the water and to further remove particulate material. The cooled water is then pumped to the cooler scrubber to complete the cycle.

A water-soluble metallic salt such as zinc chromate may be added at any point in the cooling water system; however, the most convenient point for such addition is the cooling tower. A source of zinc chromate 68 may be metered through a flow meter 70 into the cooling tower. Makeup water from source 72 is added to the cooling water circuit as required.

Figure 2:
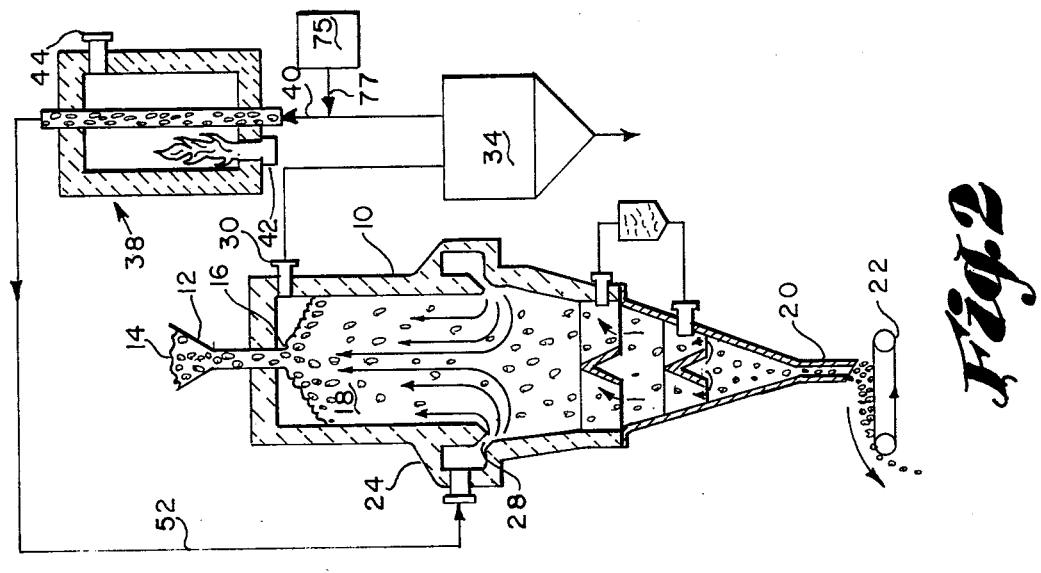
FIG. 2 is a schematic diagram similar to FIG. 1, but depicting an alternative embodiment.

The theory to which we subscribe, but do not wish to be held, is that the free metallic ion (zinc, in the zinc-chromate solution) reacts with the sulfur in the spent top-gas in the scrubber and after cooler to form an insoluble metallic sulfide (zind sulfide) which is removed with the cooling water from the scrubber cooler 34 and settles out in clarifier 60. When the salt is a chromate, the chromium is also removed from the system by a series of reactions resulting in an insoluble chromic hydroxide, which is likewise removed in the clarifier 60. An alternative embodiment is depicted in FIG. 2. Atomization chamber 75 atomizes a sulfur removing reagent and introduces it to the reformer inlet via pipe 77 along with the scrubbed and cooled top-gas to be reformed.

A suitable reagent for the subject invention is a solution of Betz No. 45 (manufactured by Betz Labs of Trevose, Pa.) which is 22% $Cr_2O_3$, 25 sodium dichromate ($Na_2Cr_2O$), 8% zinc oxide (ZnO), and 45% water.

Because there is less sulfur being admitted to the reformer in the top gas, more hydrogen and CO reducing gases are formed and less methane ($CH_4$) is emitted from the reformer in the raw condition.

To test the theory experimentally 40 ppm zinc chromate ($ZnCrO_4$) was added to the cooling tower water. Within 30 minutes after the addition, the amount of $CH_4$ in the reformer gas dropped from 1.8 to 1.45%, which is nearly a 20% reduction.

Theoretically, any water soluble salt which has a free metallic ion that forms an insoluble precipitate with sulfur may be employed in the process. However, the ion should be acid soluble, and since not all acids are comparable with all plant components, zinc chromate and zinc chloride have preferred suitability.

When zinc chromate is the selected sulfur-removing reagent, zinc chromate in the range of about 5 to about 50 ppm should be added to the cooling water. The optimum economic addition of zinc chromate added is about 14 to 20 ppm, though it is recognized that addition of more than 20 ppm may be necessary to provide a residual quantity of 10 ppm or more depending on cooling water chemistry.

The catalyst in the reformer is a high melting point carrier such as an aluminum oxide refractory material. All or part of the carrier may be impregnated with an active catalyst material such as nickel, nickel oxide or cobalt.

Active ions such as nickel oxide are believed to provide "active sites" in the porous, extensive surface areas of catalyst carriers. Catalization is thought to take place at or near these active sites (See Robertson, AJB, Catalysis of Gas Reactions by Metals, Logas, London (1970).

Since sulfur compounds mask or reduce the activity of these active sites, an excess of sulfur adhering to or deposited at these sites in the catalyst carrier will reduce catalyst effectiveness by reducing the area or number of these active sites. Thus the presence of sulfur can "poison" the catalyst. Removal of sulfur from these active sites is accomplished by action of the metallic ion carried through the water system to the catalyst bed, in reacting with and removing sulfur modules from these masked or marginally active sites. Present of the metallic ion thus regenerates the number of active sites by removal of the sulfur bearing molecular fragment.

It is clear from the foregoing that the invented process reduces the sulfur content in the top-gas fed to the reformer and removes sulfur from the catalyst activity. This in turn increases both the output of the reformer and plant reduction.

We claim:

1. In a method of producing metallic iron pellets by direct reduction of particulate iron oxide material with hot reducing gas in a reducing furnace having a reducing zone therein, removing reacted sulfur-containing gas, cooling said reacted gas in a cooler-scrubber, reforming said reacted gas into an effective reductant, and reintroducing gas to the reducing zone as reducing gas, the improvement comprising adding a sulfur-removing reagent comprising an aqueous solution of zinc chromate having a free metallic ion which forms an insoluble precipitate with sulfur to cooling water, and contacting said reacted gas with said reagent-containing water in said cooler-scrubber, whereby a substantial portion of sulfur is removed from said gas by said reagent.

2. A method according to claim 1 wherein from about 5 to about 50 ppm of zinc chromate is added to the cooling water.

3. A method according to claim 1 wherein from about 14 to about 20 ppm of zinc chromate is added to the cooling water.

* * * * *